(12) United States Patent
Gwin et al.

(10) Patent No.: US 9,317,150 B2
(45) Date of Patent: Apr. 19, 2016

(54) VIRTUAL AND CONFIGURABLE TOUCHSCREENS

(71) Applicants: Paul J. Gwin, Orangevale, CA (US); Mark E. Sprenger, Folsom, CA (US); William S. Bollengier, El Dorado Hills, CA (US)

(72) Inventors: Paul J. Gwin, Orangevale, CA (US); Mark E. Sprenger, Folsom, CA (US); William S. Bollengier, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 75 days.

(21) Appl. No.: 14/142,815

(22) Filed: Dec. 28, 2013

(65) Prior Publication Data
US 2015/0185896 A1 Jul. 2, 2015

(51) Int. Cl.
*G06F 3/042* (2006.01)
*G06F 3/041* (2006.01)
*G06F 3/043* (2006.01)

(52) U.S. Cl.
CPC .............. *G06F 3/041* (2013.01); *G06F 3/0412* (2013.01); *G06F 3/0433* (2013.01); *G06F 2203/04101* (2013.01)

(58) Field of Classification Search
CPC . G06F 3/03545; G06F 3/0412; G06F 3/0416; G06F 3/042; G06F 3/0421; G06F 3/0426; G06F 3/0433; G06F 1/1613; G06F 1/1626; G06F 3/04886; G06K 9/222
See application file for complete search history.

(56) References Cited

U.S. PATENT DOCUMENTS

| 6,094,188 A * | 7/2000 | Horton et al. ................. 345/158 |
|---|---|---|
| 6,310,615 B1 * | 10/2001 | Davis et al. .................. 345/173 |
| 6,710,770 B2 * | 3/2004 | Tomasi et al. ................. 345/168 |
| 7,158,117 B2 * | 1/2007 | Sato et al. ...................... 345/158 |
| 7,692,625 B2 * | 4/2010 | Morrison et al. ............. 345/156 |
| 7,768,505 B2 * | 8/2010 | Ishihara ........................ 345/175 |
| 8,018,579 B1 * | 9/2011 | Krah ........................... 356/4.01 |
| 8,487,915 B1 * | 7/2013 | Birger et al. .................. 345/179 |
| 8,692,768 B2 * | 4/2014 | Chtchetinine et al. ........ 345/157 |
| 8,788,676 B2 * | 7/2014 | Alameh et al. ................ 709/227 |
| 8,941,620 B2 * | 1/2015 | Sze et al. ...................... 345/175 |
| 2001/0020933 A1 * | 9/2001 | Maggioni ..................... 345/156 |
| 2001/0022579 A1 * | 9/2001 | Hirabayashi .................. 345/175 |
| 2001/0030642 A1 * | 10/2001 | Sullivan et al. ............... 345/157 |
| 2004/0108990 A1 * | 6/2004 | Lieberman et al. ........... 345/156 |
| 2008/0079902 A1 * | 4/2008 | Mandelstam-Manor et al. ............................. 351/222 |
| 2008/0169132 A1 * | 7/2008 | Ding et al. ................. 178/19.02 |
| 2008/0211766 A1 * | 9/2008 | Westerman et al. .......... 345/156 |
| 2008/0309641 A1 * | 12/2008 | Harel et al. ................... 345/173 |
| 2009/0058833 A1 * | 3/2009 | Newton ........................ 345/175 |
| 2009/0146972 A1 * | 6/2009 | Morrison et al. ............. 345/175 |
| 2010/0085330 A1 * | 4/2010 | Newton ........................ 345/175 |
| 2010/0207909 A1 * | 8/2010 | Wu et al. ...................... 345/175 |
| 2010/0207911 A1 * | 8/2010 | Newton ........................ 345/175 |
| 2010/0299390 A1 * | 11/2010 | Alameh ................. G06F 3/017 709/204 |
| 2011/0063224 A1 * | 3/2011 | Vexo et al. .................... 345/168 |

* cited by examiner

*Primary Examiner* — Joe H Cheng
(74) *Attorney, Agent, or Firm* — Jordan IP Law, LLC

(57) ABSTRACT

Systems and methods may provide virtual and configurable touchscreens. The systems and methods may include a plurality of micro impulse radar (MIR) transceivers and logic to determine a location of an input object such as a finger or pointer based on signals from the plurality of MIR transceivers. The MIR transceivers may also create a virtual touchscreen in a plane coincident (adjacent) to or spaced apart from (offset) with respect to a display screen. The MIR transceivers may also map the location of the input object to a position on the display screen. In one example, the system uses triangulation to determine the location of the input object in a virtual plane that creates the virtual touchscreen.

22 Claims, 5 Drawing Sheets

VIRTUAL AND CONFIGURABLE TOUCHSCREENS

BACKGROUND

Computer systems may utilize a variety of input devices including, for example, a keyboard, a mouse, a pointer, a touch pad, and the like, in order to provide inputs to a processor. Some modern computing devices including, for example, notebook computers, desktop computers, smart tablets, smart phones, mobile Internet devices (MIDs), media players, all-in-one computers, video game consoles, automatic teller machines (ATMs), graphical user interfaces (GUIs), and the like, may include a touchscreen or electronic visual display as a user interface. Further, some operating systems may be touchscreen compatible, wherein the touchscreen allows users to make screen inputs via simple or multi-touch gestures (e.g., with a finger(s), stylus, light pen, or the like).

The touchscreen may also allow users to interact with content displayed on the screen and determine how the content is displayed. Standard touchscreens may utilize one or more of a variety of touch sensing technologies including, for example, resistive, capacitive, surface acoustic wave (SAW), optical, infrared, and similar sensors. These sensors may be somewhat complex and are typically required to be integrated within the screen or display. The sensors may provide suitable accuracy but can add to the screen thickness and mass. Touchscreens are also relatively costly and tend to substantially increase the price of a system employing such technology.

BRIEF DESCRIPTION OF THE DRAWINGS

The various novel aspects of the embodiments of the present disclosure will become evident to a person of ordinary skill in the art given the following enabling specification and appended claims, and by referencing the following drawings, in which:

DETAILED DESCRIPTION OF THE DRAWINGS

Figure 1A:
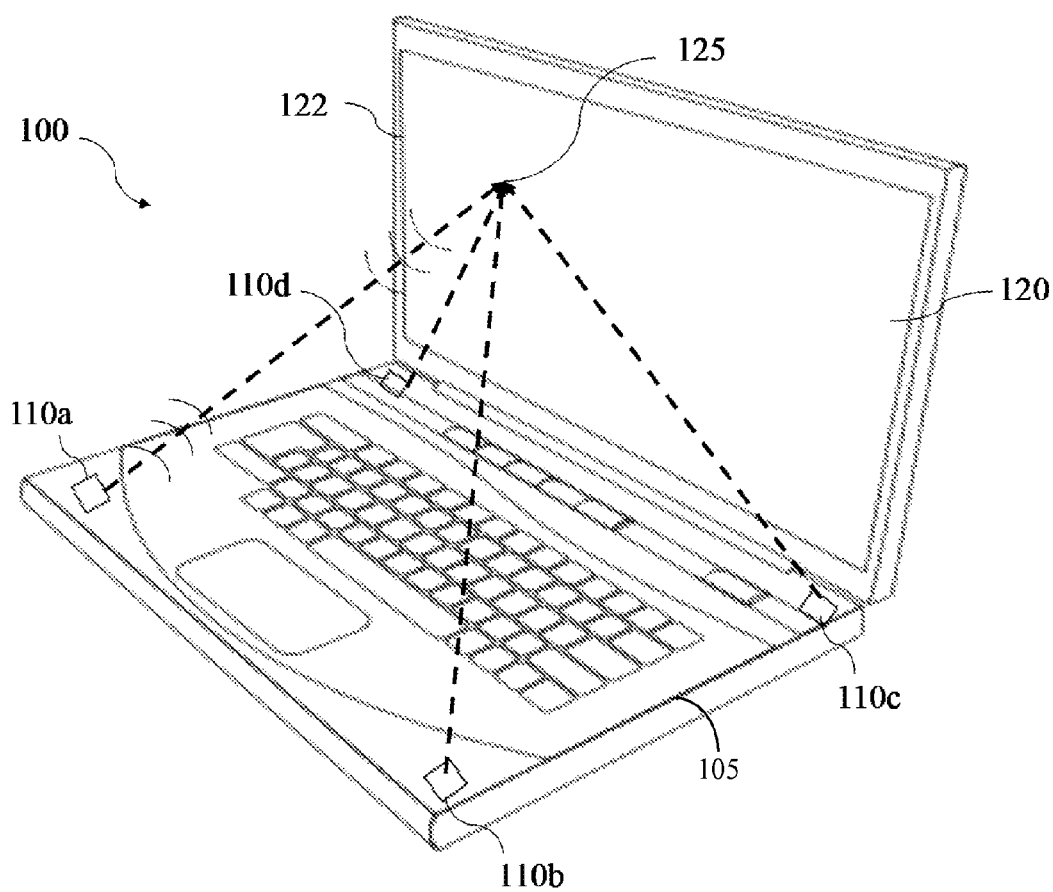
FIGS. 1A-1B are illustrations of alternative examples of a virtual touchscreen device according to an embodiment.
Figure 1B:
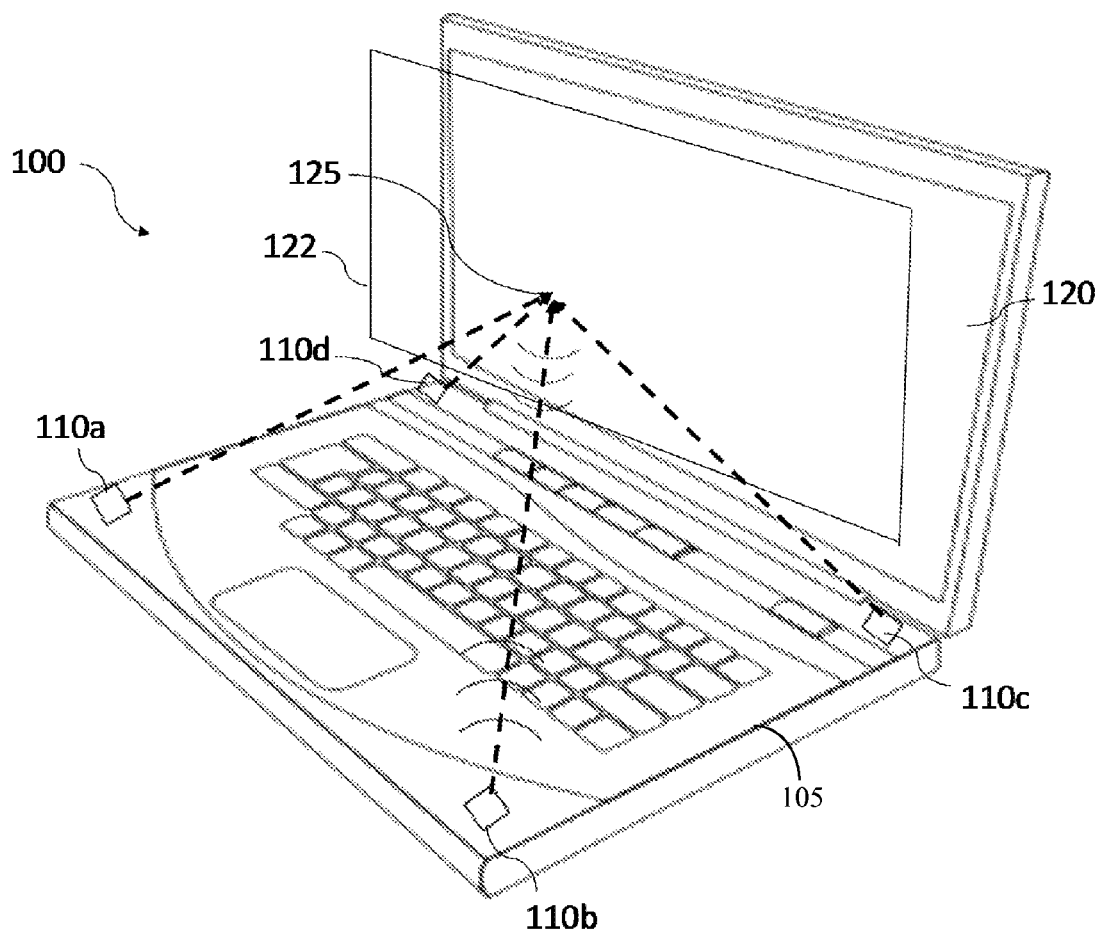

FIGS. 1A and 1B show examples of a device 100 in accordance with an embodiment of the present disclosure. The device 100 may be, for example, a laptop computer having a display or screen 120. While a standard laptop or notebook computer is shown, it should be noted that this illustration is only for discussion purposes. Other computing devices may be used without departing from the disclosure including, for example, notebook computers, desktop computers, smart tablets, smart phones, mobile Internet devices (MIDs), media players, all-in-one computers, video game consoles, automatic teller machines (ATMs), graphical user interfaces (GUIs), and other similar devices. The illustrated device 100 includes a screen 120 and a plurality of sensors 110a-110d. The plurality of sensors 110a-110d may be, for example, ultra-wide band micro impulse radar (MIR) transceivers. The sensors 110a-110d may produce a virtual touchscreen 122 in a plane that is either coincident with the screen 120 or spaced at some distance (e.g., a few millimeters to several inches), from the screen 120 to provide touchless input relative to the screen 120. The sensors 110a-110d may therefore significantly reduce contamination and wear on the screen 120. The illustrated device 100 may also include a base 105 (e.g., a computer housing, frame, or the like) that supports and positions the plurality of sensors 110a-110d relative to the screen 100.

More particularly, the virtual touchscreen 122, as shown in FIG. 1A, may be substantially adjacent or coincident (e.g., within a few millimeters), to the screen 120. Also, for example, the virtual touchscreen 122, as shown in FIG. 1B, may be offset or spaced apart, i.e., within a few inches, from the screen 120. It should be noted that while four sensors 110a-110d are shown, the number and position of the sensors 110a-110d have been selected for discussion purposes only. The number and position of the sensors may be adjusted as required without departing from the disclosure. It should also be noted that the distance and dimensions of the illustrated planes provided herein are for discussion purposes only and may be adjusted as required without departing from the disclosure.

Figure 2:
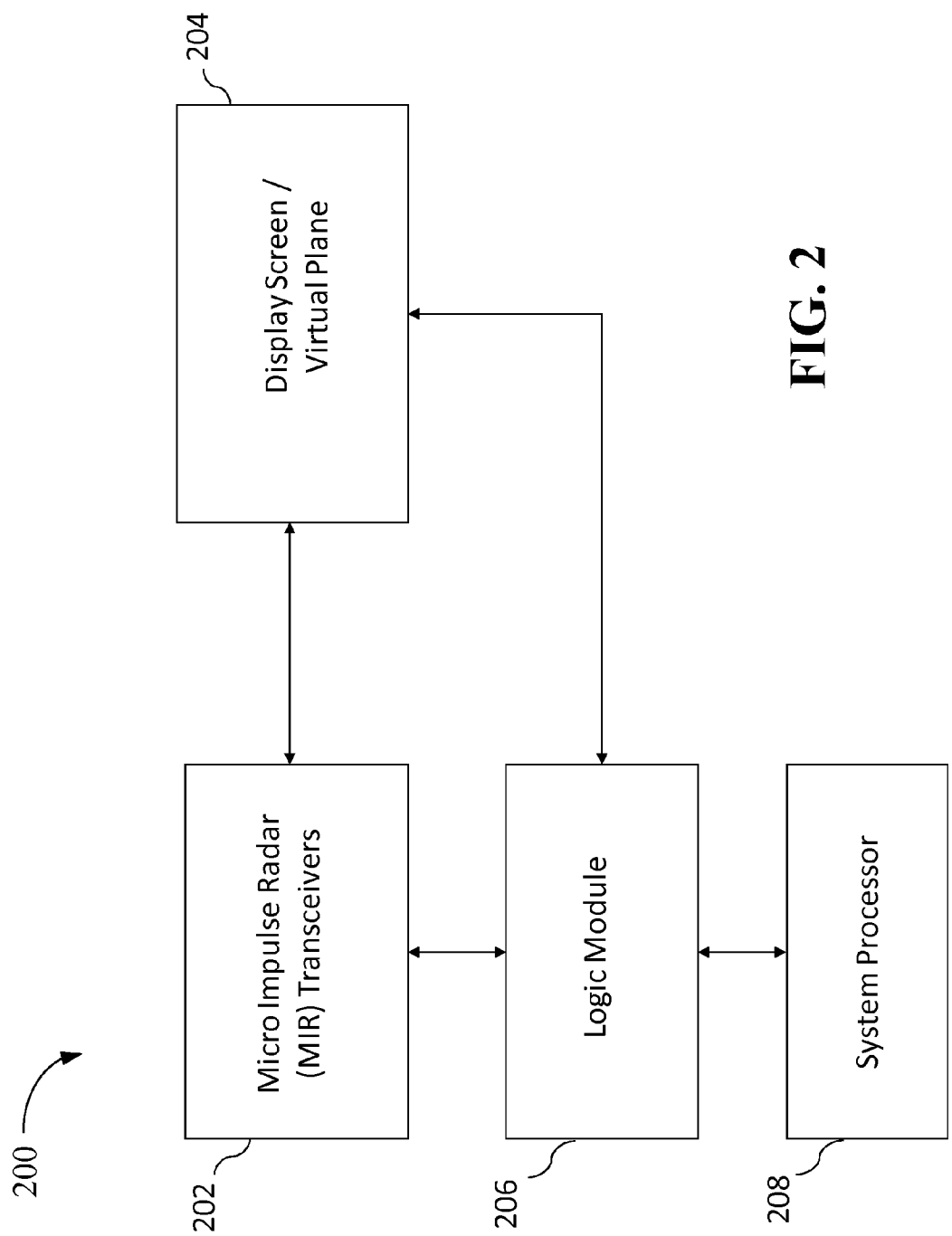
FIG. 2 is a block diagram of an example of a virtual touchscreen system according to an embodiment.

FIG. 2 shows a block diagram of an example of a virtual touchscreen system 200 according to an embodiment. The virtual touchscreen 200 may include an MIR transceiver module 202, a display screen/virtual plane 204, a logic module 206, and a system processor 208. The MIR transceiver module 202 may include a plurality of MIR transceivers and is in communication with the display screen/virtual plane 204 and logic module 206. The MIR transceiver module 202 may transmit the input/output (I/O) signals of the plurality of MIR transceivers with respect to the display screen/virtual plane 204. The display screen/virtual plane may also communicate with the logic module 206 in order to determine the position of an input device with respect to the display screen/virtual plane 204. The logic module 206 may be in communication with the MIR transceivers 202, display screen/virtual plane 204, and system processor 208 such that a position and gesture inputs of an input device (e.g., finger, pointer, stylus, or other object) may be determined with respect to the display screen/virtual plane 204. Based on the determined position and gesture inputs of the input device, the intended inputs may be determined by the logic module and transmitted to and acted on by the system processor 208. The logic module 206 may include positioning technology (e.g., triangulation technology), which may be implemented via, for example, a set of logic instructions or fixed functionality hardware, suitable to determine the position and input gestures of an input device.

With continuing reference to FIGS. 1A, 1B and 2, the sensors 110a-110d may detect the movement and position of a touch input device (e.g., finger, pointer, stylus, or other object used as a touch input device), that touches the plane of the virtual touchscreen 122. Ultra-wide band micro-impulse radar (MIR) sensors may provide exceptional accuracy in determining the position of objects, e.g., a finger, pointer, or similar object, in very small time steps and provide an ideal technology for forming the sensors 110a-110d. When a finger or pointer touches the plane of the virtual touchscreen 122, action may be taken similar to standard touchscreen configurations in order to respond to the user input.

The sensors 110a-110d may include, for example, transceivers that emit and receive signals, wherein the emitted signals may effectively create the virtual touchscreen 122. The received signals may indicate the position of an input device with respect to the virtual touchscreen 122 in order to track the position of the input device and to indicate when the input device has penetrated the plane to trigger a touch (i.e., an input). In addition, a positioning technology such as, for example, triangulation, may be used to determine the position of the input device with respect to the virtual touchscreen 122. The ultra-wide band MIR sensors may provide position detection accuracy within a fraction of a millimeter (mm). The illustrated sensors 110a-110d therefore allow touch inputs on surfaces other than the display 120 and enable virtual surfaces or planes that are user configurable. For example, multiple virtual touchscreens (i.e., multiple touch planes or surfaces), may be configured simultaneously, if desired, without departing from the disclosure. The multiple planes may include varied parameters such as, for example, varied sensitivity to touch.

MIR sensors provide low cost, low power radar that sends out very short electromagnetic pulses. MIR sensors may include an impulse generator or transmitter, an impulse receiver, and a send/receive antenna. MIR sensors operate by sending short wave impulses that return when bounced off objects and are collected by the receive antenna. The impulse emitted or sent by the MIR sensor returns when it is reflected off an object. The strength of the returned (received) signal is affected by the material properties of the object and the distance from the send/receive antenna. Based on the timing and strength of the return signal, the object can be identified in composition, location, size, and the like. In some examples, some objects may absorb substantial amounts of energy such that a reflection may not occur. This absorption or partial absorption may be used to assist in determining the composition of the objects.

Because MIR sensors use ultra-wide band impulse, different objects can be identified based on a correlation frequency response of the object material type. Objects may have a varying transparency based on the frequency of the impulse. Ultra-wide band frequency may also allow determination of a frequency that can penetrate barrier objects (e.g., paper, plastic, thin films, fabric, and the like) while the object of scanning interest (e.g., a finger, pointer, or similar object) responds to that frequency. The MIR sensor may therefore enable detection of shadow objects behind physical barriers. Accordingly, MIR frequency and associated high wave velocity may provide MIR sensors with fine resolution of object location. Further, object motion may be tracked and predicted using fast location refresh cycles. Such an approach may enable recognition of gesture inputs (e.g., hand motions, head movement, and the like), on the order of less than 1 millimeter or a few millimeters, at distances from greater than one inch to approximately six feet, etc., and is scalable to longer distances.

Multiple sensors 110a-110d may be placed on the device 100 in geographically diverse locations in order to map the position of objects in three dimensional (3D) space. Positioning technology (e.g., triangulation), may then be used to determine the position of objects in space (3-D). Because the coordinates of the plane of the virtual touchscreen 122 are known relative to a network global coordinate system (formed by the transceivers), the system may precisely determine when an object has entered into the plane of the virtual touchscreen 122 and may act in response to the object as a "touch" input. The system may also determine when the object is still present in the plane and the depth of penetration into the plane. The system thereby provides a significant increase in touchscreen functionality while substantially reducing the cost of the touchscreen. Due to the ability of the MIR sensors 110a-110d to map objects, as opposed to just a point on the object or leading edge of the object, the sensors 110a-110d may allow distinguishing of object type and may thereby trigger only on intended objects.

Figure 3:
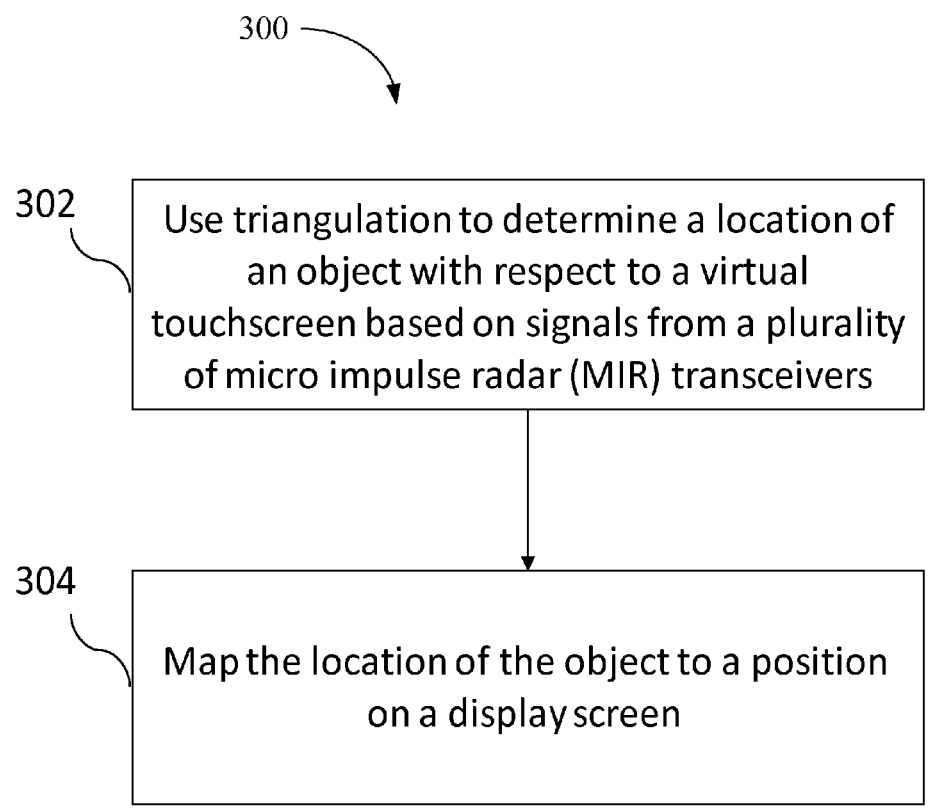
FIG. 3 is a flowchart of an example of a method of providing a virtual touchscreen according to an embodiment.

FIG. 3 shows a flowchart of an example of a method 300 for providing a virtual touchscreen according to an embodiment. The method 300 may be implemented in executable software as a set of logic instructions stored in a machine- or computer-readable storage medium of a memory such as random access memory (RAM), read-only memory (ROM), programmable ROM (PROM), firmware, flash memory, etc., in configurable logic such as, for example programmable logic arrays (PLAs), field programmable gate arrays (FPGAs), complex programmable logic devices (CPLDs), in fixed functionality logic hardware using circuit technology such as, for example, application-specific integrated circuits (ASIC), complementary metal oxide semiconductor (CMOS) or transistor-transistor logic (TTL) technology, or any combination thereof. For example, computer program code to carry out operations shown in method 300 may be written in any combination of one or more programming languages including an object-oriented programming language such as Java, Smalltalk, C++ or the like and conventional procedural programming languages, such as the "C" programming language or similar programming languages.

Illustrated processing block 302 provides for using triangulation to determine a location of an object with respect to a virtual touchscreen based on signals from a plurality of micro impulse radar (MIR) transceivers. The MIR transceivers may be wide band MIR transceivers that define the plane of the virtual touchscreen. The MIR transceivers may also determine the position and input gestures of an input device with respect to the virtual touchscreen in order to provide inputs. Illustrated block 304 provides for mapping the location of the object to a position on a display screen. Mapping the location of the object with respect to the display screen may therefore increase the utility and functionality of the virtual touchscreen.

Figure 4:
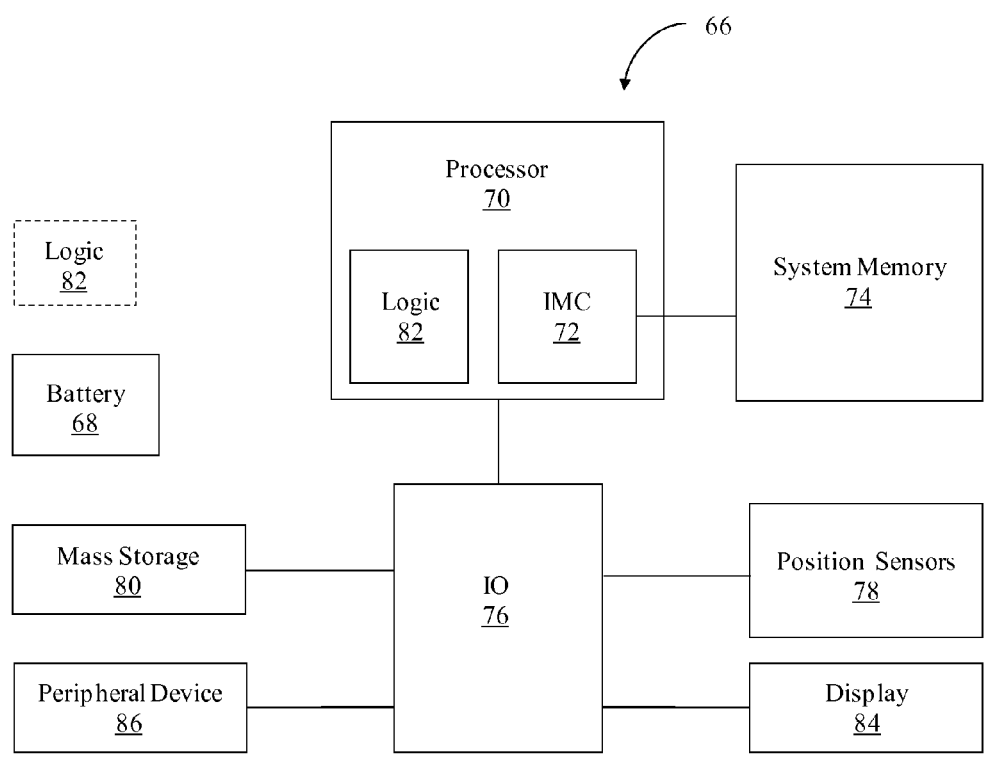
FIG. 4 is block diagram of an example of a system according to an embodiment.

FIG. 4 shows a system 66. The system 66 may be part of a platform having computing functionality (e.g., personal digital assistant/PDA, desktop computer, laptop, tablet computer, convertible tablet), communications functionality (e.g., wireless smart phone), imaging functionality, media playing functionality (e.g., smart television/TV), or any combination thereof (e.g., mobile Internet device/MID). In the illustrated example, the system 66 includes a battery 68 to supply power to the system 66 and a processor 70 having an integrated memory controller (IMC) 72, which may communicate with system memory 74. The system memory 74 may include, for example, dynamic random access memory (DRAM) configured as one or more memory modules such as, for example, dual inline memory modules (DIMMs), small outline DIMMs (SODIMMs), etc.

The illustrated system 66 also includes a input output (JO) module 76, sometimes referred to as a Southbridge of a chipset, that functions as a host device and may communicate with, for example, a display 84 (e.g., OLED display, liquid crystal display/LCD, etc.), a peripheral device 86, e.g., a camera, a plurality of position sensors 78 (e.g., ultra-wide band MIR sensors) and mass storage 80 (e.g., hard disk drive/HDD, optical disk, flash memory, etc.). The processor 70 may execute one or more positioning applications (not shown).

The illustrated processor 70 may also execute logic 82 that is configured to receive one or more signals from the position sensors 78, determine a position of an input device with respect to a virtual plane (not shown), and map the position to a position on the display 84 based at least in part on inputs from the position sensors 78. Thus, the illustrated logic 82 may function similarly to the logic module (FIG. 2), already discussed.

The logic 82 may also determine and adjust the position of multiple planes of the virtual touchscreen. In one example, the adjustments also take into consideration one or more sensitivity considerations of the one or multiple planes of the virtual touchscreens. The logic 82 may alternatively be implemented external to the processor 70. Additionally, the processor 70 and the JO module 76 may be implemented together on the same semiconductor die as a system on chip (SoC).

Additional Notes and Examples

Example 1 may include a virtual and configurable touchscreen system, having a display screen, a plurality of micro impulse radar (MIR) transceivers, and logic. The logic is to use triangulation to determine a location of an object based on signals from the plurality of MIR transceivers, and map the location of the object to a position on the display screen. The logic may be implemented at least partially in fixed-functionality hardware.

Example 2 may include the system of example 1, wherein the logic is to determine the location of the object in a virtual plane.

Example 3 may include the system of example 2, wherein the virtual plane is to be coincident with the display screen.

Example 4 may include the system of example 2, wherein the virtual plane is to be offset from the display screen.

Example 5 may include the system of example 1, wherein the logic is to determine and adjust the position of one or more planes of the virtual touchscreen.

Example 6 may include the system of example 1, wherein the logic is to use triangulation to determine locations of a plurality of objects in a corresponding plurality of virtual planes that are offset from the display screen, and map the locations of the plurality of objects to positions on the display screen.

Example 7 may include the system of example 1, wherein the logic is to determine one or more of a composition or a size of the object.

Example 8 may include the system of example 7, wherein the composition or size of the object is determined based on one or more of a timing of return signals associated with the MIR transceivers, a strength of return signals associated with the MIR transceivers or a frequency of transmitted signals associated with the MIR transceivers.

Example 9 may include the system of example 1, wherein the logic is to distinguish the object from one or more barrier objects.

Example 10 may include the system of example 1, further including a base, wherein the base supports and positions the plurality of micro impulse radar (MIR) transceivers relative to the display screen.

Example 11 may include a method for providing a virtual and configurable touchscreen, including using triangulation to determine a location of an object based on signals from a plurality of micro impulse radar (MIR) transceivers, and mapping the location of the object to a position on a display screen.

Example 12 may include the method of example 11, wherein determining the location of the object includes determining the location of the object in a virtual plane.

Example 13 may include the method of example 12, wherein the virtual plane is coincident with the display screen.

Example 14 may include the method of example 12, wherein the virtual plane is offset from the display screen.

Example 15 may include the method of example 11, further including determining and adjusting, via a logic module, the position of one or more planes of the virtual touchscreen.

Example 16 may include the method of example 11, further including using triangulation, via a logic module, to determine locations of a plurality of objects in a corresponding plurality of virtual planes that are offset from the display screen, and mapping, via the logic module, the locations of the plurality of objects to positions on the display screen.

Example 17 may include the method of example 11, further including determining, via a logic module, one or more of a composition or a size of the object.

Example 18 may include the method of example 11, wherein the composition or size of the object is determined based on one or more of a timing of return signals associated with the MIR transceivers, a strength of return signals associated with the MIR transceivers or a frequency of transmitted signals associated with the MIR transceivers.

Example 19 may include the method of example 11, including distinguishing, via a logic module, the object from one or more barrier objects.

Example 20 may include the method of example 11, further including supporting and positioning, via a base, the plurality of micro impulse radar (MIR) transceivers relative to the display screen.

Example 21 may include a virtual and configurable touchscreen apparatus, including logic, implemented at least partly in fixed-functionality hardware, to use triangulation to determine a location of an object based on signals from a plurality of micro impulse radar (MIR) transceivers, and map the location of the object to a position on a display screen.

Example 22 may include the apparatus of example 21, wherein the logic is to determine the location of the object in a virtual plane.

Example 23 may include the apparatus of example 22, wherein the virtual plane is to be coincident with the display screen.

Example 24 may include the apparatus of example 22, wherein the virtual plane is to be offset from the display screen.

Example 25 may include the apparatus of example 21, wherein the logic is to use triangulation to determine locations of a plurality of objects in a corresponding plurality of virtual planes that are offset from the display screen, and map the locations of the plurality of objects to positions on the display screen.

Example 26 may include the apparatus of example 21, wherein the logic is to determine one or more of a composition or a size of the object.

Example 27 may include the apparatus of example 26, wherein the composition or size of the object is determined based on one or more of a timing of return signals associated with the MIR transceivers, a strength of return signals associated with the MIR transceivers or a frequency of transmitted signals associated with the MIR transceivers.

Example 28 may include the apparatus of example 21, wherein the logic is to distinguish the object from one or more barrier objects.

Example 29 may include the apparatus of example 21, wherein the base supports and positions the plurality of micro impulse radar (MIR) transceivers relative to the display screen.

Example 30 may include at least one computer readable storage medium including a set of instructions which, if executed by a computing device, cause a computing device to use triangulation to determine a location of an object based on signals from a plurality of micro impulse radar (MIR) transceivers, and map the location of the object to a position on a display screen.

Example 31 may include the at least one computer readable storage medium of example 30, wherein the instructions, if executed, further cause the computing device to determine the location of the object in a virtual plane.

Example 32 may include the at least one computer readable storage medium of example 31, wherein the virtual plane is to be coincident with the display screen.

Example 33 may include the at least one computer readable storage medium of example 31, wherein the virtual plane is to be offset from the display screen.

Example 34 may include the at least one computer readable storage medium of example 30, wherein the instructions, if executed, further cause the computing device to use triangulation to determine locations of a plurality of objects in a corresponding plurality of virtual planes that are offset from the display screen; and map the locations of the plurality of objects to positions on the display screen.

Example 35 may include the at least one computer readable storage medium of example 30, wherein the instructions, if executed, further cause a computing device to determine one or more of a composition or a size of the object based on one or more of a timing of return signals associated with the MIR transceivers, a strength of return signals associated with the MIR transceivers or a frequency of transmitted signals associated with the MIR transceivers.

Example 36 may include the at least one computer readable storage medium of example 30, wherein the instructions, if executed, further cause a computing device to distinguish the object from one or more barrier objects.

Example 37 may include a virtual and configurable touchscreen system, including means for using triangulation to determine a location of an object based on signals from a plurality of micro impulse radar (MIR) transceivers; and means for mapping the location of the object to a position on a display screen.

Example 38 may include the system of example 37, wherein the means for using triangulation to determine the location of the object includes means for determining the location of the object in a virtual plane.

Example 39 may include the system of example 38, wherein the virtual plane is coincident with the display screen.

Example 40 may include the system of example 38, wherein the virtual plane is offset from the display screen.

Example 41 may include the system of example 38, further including means for determining and adjusting the position of one or more planes of the virtual touchscreen.

Example 42 may include the system of example 37, further including means for determining locations of a plurality of objects in a corresponding plurality of virtual planes that are offset from the display screen, and means for mapping the locations of the plurality of objects to positions on the display screen.

Example 43 may include the system of example 37, further including means for determining one or more of a composition or a size of the object.

Example 44 may include the system of example 43, wherein the composition or size of the object is determined based on one or more of a timing of return signals associated with the MIR transceivers, a strength of return signals associated with the MIR transceivers or a frequency of transmitted signals associated with the MIR transceivers.

Example 45 may include the system of example 37, further including means for distinguishing the object from one or more barrier objects.

Example 46 may include the system of example 37, further including means for supporting and positioning the plurality of micro impulse radar (MIR) transceivers relative to the display screen.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments of this have been described in connection with particular examples thereof, the true scope of the embodiments should not be so limited since other modifications will become apparent to the skilled practitioner upon a study of the drawings, specification, and following claims.

We claim:
1. A system comprising:
   a display screen;
   a plurality of micro impulse radar (MIR) transceivers, wherein the MIR transceivers are disposed in a fixed position to transmit and receive MIR signals; and
   logic, implemented at least partly in fixed-functionality hardware, to,
      use triangulation to determine a location of an object based on signals from the plurality of MIR transceivers, and
      map the location of the object to a position on the display screen,
   wherein the logic is to determine one or more of a composition or a size of the object based on one or more of a timing of return signals associated with the MIR transceivers, a strength of return signals associated with the MIR transceivers or a frequency of transmitted signals associated with the MIR transceivers.

2. The system of claim 1, wherein the logic is to determine the location of the object in a virtual plane.

3. The system of claim 2, wherein the virtual plane is to be coincident with the display screen.

4. The system of claim 2, wherein the virtual plane is to be offset from the display screen.

5. The system of claim 1, wherein the logic is to determine and adjust the position of one or more planes of a virtual touchscreen.

6. The system of claim 1, wherein the logic is to,
   use triangulation to determine locations of a plurality of objects in a corresponding plurality of virtual planes that are offset from the display screen, and
   map the locations of the plurality of objects to positions on the display screen.

7. The system of claim 1, wherein the logic is to distinguish the object from one or more other objects.

8. The system of claim 1, further comprising a base, wherein the base supports and positions the plurality of micro impulse radar (MIR) transceivers relative to the display screen.

9. A method comprising:
   using triangulation to determine a location of an object based on signals from a plurality of micro impulse radar (MIR) transceivers, wherein the MIR transceivers are disposed in a fixed position to transmit and receive MIR signals;
   mapping the location of the object to a position on a display screen; and
   determining one or more of a composition or a size of the object based on one or more of a timing of return signals associated with the MIR transceivers, a strength of return signals associated with the MIR transceivers or a frequency of transmitted signals associated with the MIR transceivers.

10. The method of claim 9, wherein determining the location of the object includes determining the location of the object in a virtual plane.

11. The method of claim 10, wherein the virtual plane is coincident with the display screen.

12. The method of claim 10, wherein the virtual plane is offset from the display screen.

13. An apparatus comprising:
   logic, implemented at least partly in one or more of configurable logic or fixed-functionality hardware, to, use triangulation to determine a location of an object based on signals from a plurality of micro impulse radar (MIR) transceivers, wherein the MIR transceivers are disposed in a fixed position to transmit and receive MIR signals, map the location of the object to a position on a display screen, and determine one or more of a composition or a size of the object based on one or more of a timing of return signals associated with the MIR transceivers, a strength of return signals associated with the MIR transceivers or a frequency of transmitted signals associated with the MIR transceivers.

14. The apparatus of claim 13, wherein the logic is to determine the location of the object in a virtual plane.

15. The apparatus of claim 14, wherein the virtual plane is to be coincident with or offset from the display screen.

16. The apparatus of claim 13, wherein the logic is to, use triangulation to determine locations of a plurality of objects in a corresponding plurality of virtual planes that are offset from the display screen, and map the locations of the plurality of objects to positions on the display screen.

17. At least one non-transitory computer readable storage medium comprising a set of instructions which, if executed by a computing device, cause the computing device to:

use triangulation to determine a location of an object based on signals from a plurality of micro impulse radar (MIR) transceivers, wherein the MIR transceivers are disposed in a fixed position to transmit and receive MIR signals, map the location of the object to a position on a display screen, and determine one or more of a composition or a size of the object based on one or more of a timing of return signals associated with the MIR transceivers, a strength of return signals associated with the MIR transceivers or a frequency of transmitted signals associated with the MIR transceivers.

18. The at least one computer readable storage medium of claim 17, wherein the instructions, if executed, cause the computing device to determine the location of the object in a virtual plane.

19. The at least one computer readable storage medium of claim 18, wherein the virtual plane is to be coincident with the display screen.

20. The at least one computer readable storage medium of claim 18, wherein the virtual plane is to be offset from the display screen.

21. The at least one computer readable storage medium of claim 17, wherein the instructions, if executed, cause the computing device to:

use triangulation to determine locations of a plurality of objects in a corresponding plurality of virtual planes that are offset from the display screen; and map the locations of the plurality of objects to positions on the display screen.

22. The at least one computer readable storage medium of claim 17, wherein the instructions, if executed, cause a computing device to distinguish the object from one or more other objects.

\* \* \* \* \*